June 23, 1959
N. W. BELL
2,892,147
DIGITAL-TO-ANALOG CONVERTER
Filed June 21, 1957
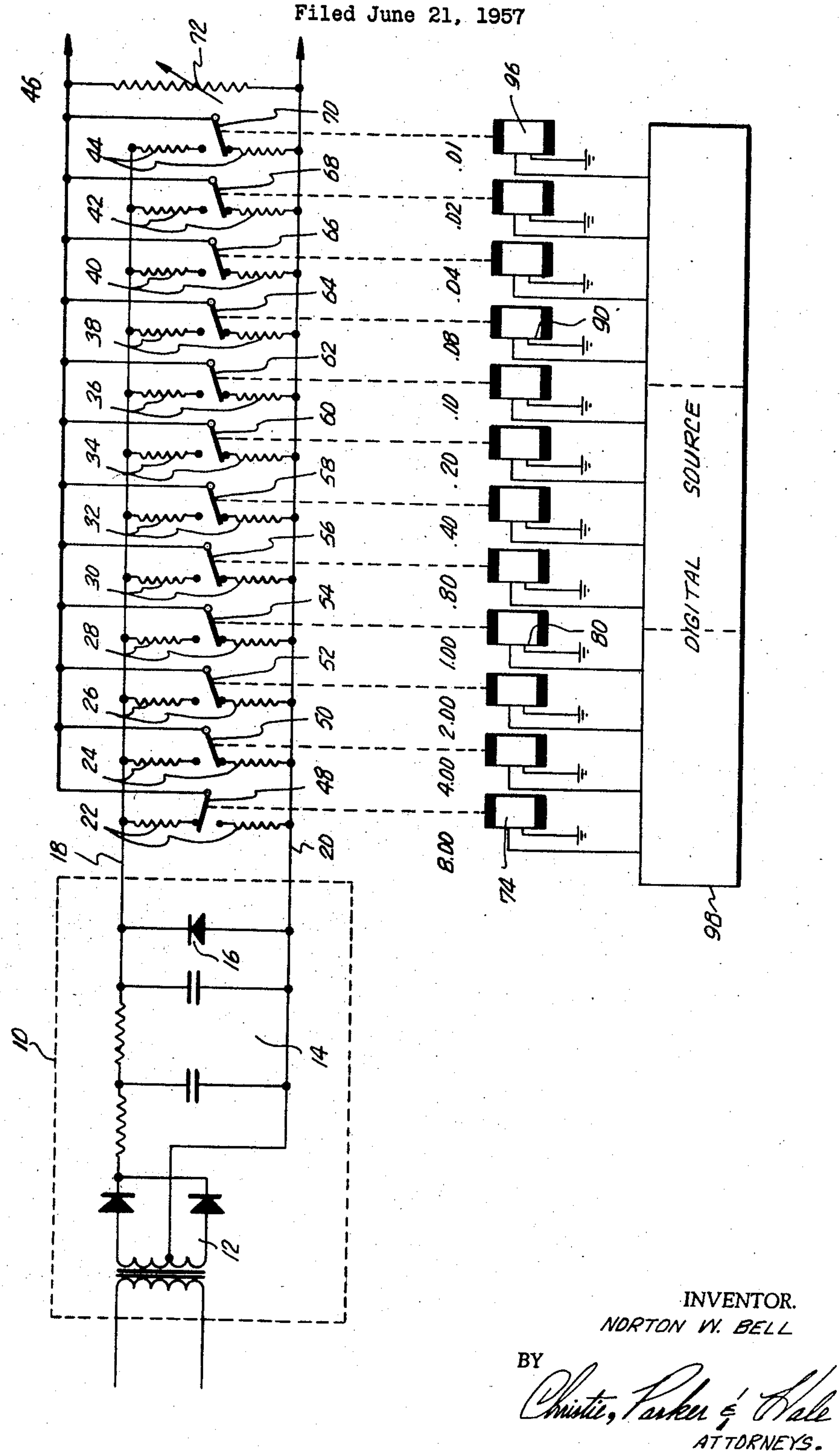
INVENTOR.
NORTON W. BELL
BY Christie, Parker & Hale
ATTORNEYS.

United States Patent Office 2,892,147

Patented June 23, 1959

2,892,147

DIGITAL-TO-ANALOG CONVERTER

Norton W. Bell, Monrovia, Calif., assignor to Consolidated Electrodynamics Corporation, Pasadena, Calif., a corporation of California Application June 21, 1957, Serial No. 667,229

4 Claims. (Cl. 323—79)

This invention relates to converters, and more particularly is concerned with a resistive network for converting digital information stored in relays to an analog voltage.

Various digital-to-analog converter circuits have heretofore been proposed in which the settings of a plurality of switches according to a particular digital number in coded form is converted by a resistive network to a corresponding output voltage level. Such circuits require an extremely well regulated voltage source and highly precise resistors, since the output must be varied in a large number of small increments. The larger the number of digital values on the input, the higher the precision of the voltage source and the voltage dividing resistive network to convert each digital value into a reproducible voltage level which can be resolved from the voltage level of the next closest digital value.

The present invention provides a switch-controlled additive voltage divider circuit, i.e. one in which the incremental voltage change produced at the output by operation of a given switch is independent of the condition of any other switches. The circuit of the present invention has several advantages over other known additive voltage divider circuits for use as a digital-to-analog converter. For example, the circuit of the present invention uses comparatively few resistors in the network. Of these resistors only a fraction have to be of a high precision type. The high precision resistors are limited to the ones having the lowest resistive values in the network, values in which precision is more readily available. The present circuit has a constant output impedance which may be reasonably high in value. The input impedance, although it varies with different switch settings, has a minimum value which is substantially higher than the output impedance. Thus the present circuit may be used with a power supply having appreciable input impedance without adversely loading the supply or affecting its regulation.

The above advantages are achieved by a circuit comprising a plurality of pairs of resistors, the resistors in each pair being equal, but the resistance value of successive pairs being graded according to the digital code of the digital input. The resistors in each pair are connected respectively to the two terminals of the power supply. Switches selectively connect one or the other of each of the resistors in a pair to a common output terminal, the other output terminal being connected to one terminal of the supply. Setting of the switches determines the voltage appearing across the output terminals.

For a more complete understanding of the invention reference should be had to the accompanying drawing, wherein the single figure is a schematic wiring diagram of the converter circuit.

Referring to the figure in detail, the numeral 10 indicates generally a D.C. power supply which may include a fullwave rectifier 12, an R-C filter section 14, and a Zener diode voltage regulator 16. The output potential from the power supply 10 is developed across two leads 18 and 20 between which are connected a plurality of pairs of resistors 22 to 44. The two resistors in each pair are equal to each other in resistance and therefore are identified by the same number on the drawing. The common output terminal 46 is connected to the conductors 18 and 20 respectively through one or the other of each of the pairs of resistors 22, 44 by double-pole double-throw switches 48 through 70. The output is derived across an adjustable resistor 72 connected between the common output lead 46 and the conductor 20.

It will be seen from inspection of the circuit diagram that the impedance at the output looking back into the resistive network is a constant regardless of the condition of the switches. The input impedance varies from infinity with all the switches in the down position to some minimum value corresponding to the impedance of all the resistors in parallel.

The proper value of any resistor can be found from the following equation:

$$R=R_0\left(\frac{V_{in}}{V_{out}}\right)$$

The value of $R_0$ can be selected as any convenient value, for example, of the order of 50,000 ohms. The $V_{in}$ can be determined by the maximum output voltage desired and $V_{out}$ is determined by the output voltage to be produced by the switch associated with the resistor R whose value is being calculated. The adjustable resistance 72 across the output is adjusted to set the maximum output voltage as required. All the other intermediate voltages are, of course, adjusted accordingly.

A typical example of the utility of the additive voltage divider circuit above described is its use as a digital-to-analog converter; for example, where digital information is in binary coded decimal form using an 8, 4, 2, 1 code. In such a typical application, each of the switches 48 through 70 may be operated by a corresponding number of relays indicated at 74 through 96. The relay 96, which corresponds to the least significant binary bit of the least significant decimal digit should introduce a 10 millivolt change in the output when actuated. Consistent with the 8, 4, 2, 1 binary coded arrangement each of the other relays in turn should introduce .02 volt, .04 volt, .08 volt, .10 volt, .20 volt, .40 volt, .80 volt, 1.0 volt, 2.0 volts, 4.0 volts, and 8.0 volts, respectively, proceeding from right to left as viewed in the figure. The output voltage from the supply then should be at least 16.65 volts, corresponding to the sum of all the voltage increments introduced by the respective relays when actuated. Substituting the appropriate figures in the above equation for the resistance values, it will be seen that the resistances should have values as given in the following table:

| | |
|---|---|
| Resistors **22** | 100K±$\frac{1}{40}$% |
| Resistors **24** | 200K±$\frac{1}{20}$% |
| Resistors **26** | 400K±$\frac{1}{10}$% |
| Resistors **28** | 800K±$\frac{1}{4}$% |
| Resistors **30** | 1M±$\frac{1}{2}$% |
| Resistors **32** | 2M±1% |
| Resistors **34** | 4M±2% |
| Resistors **36** | 8M±4% |
| Resistors **38** | 10M±5% |
| Resistors **40** | 20M±10% |
| Resistors **42** | 40M±20% |
| Resistors **44** | 80M±40% |

These figures correspond to an output impedance $R_0$ of approximately 50K. The percent tolerances are calculated on a normal distribution of values of resistance in a batch and that the worst possible condition, namely, that all the resistors would be at the same extreme of their tolerance limits would not normally occur. It will be seen that the tightest tolerances are on the low value resistors. These resistors are generally wire-wound and therefore easier to obtain within small tolerance limits.

What is claimed is:

1. An additive voltage divider network comprising a plurality of pairs of resistors, the resistors in a pair being equal, switching means associated with each pair of resistors for selectively connecting one end of the resistors in the pair to a common output terminal, means for connecting the opposite end of one of the resistors in each pair to another output terminal and to an input terminal, means for connecting the opposite end of the other of the resistors in each pair to another input terminal, means for applying fixed voltage across the input terminals, and variable resistance means across the output terminals for adjusting the relative magnitude of the output voltage.

2. An additive voltage divider network comprising a plurality of pairs of resistors, the resistors in a pair being equal, switching means associated with each pair of resistors for selectively connecting one end of the resistors in the pair to a common output terminal, means for connecting the opposite end of one of the resistors in each pair to another output terminal and to an input terminal, means for connecting the opposite end of the other of the resistors in each pair to another input terminal, and means for applying fixed voltage across the input terminals.

3. An additive voltage divider network comprising a plurality of pairs of resistors, the resistors in a pair being equal, switching means associated with each pair of resistors for selectively connecting one end of the resistors in the pair to a conmmon output terminal, means for connecting the opposite end of one of the resistors in each pair to another output terminal and to an input terminal, and means for connecting the opposite end of the other of the resistors in each pair to another input terminal.

4. Apparatus as defined in claim 3 wherein the switching means includes a plurality of relays on which may be stored a digital number in binary coded form.

References Cited in the file of this patent

UNITED STATES PATENTS

| | | |
|---|---|---|
| 2,762,038 | Lubkin | Sept. 4, 1956 |
| 2,784,369 | Fenemore et al. | Mar. 5, 1957 |